(12) United States Patent
Fukui et al.

(10) Patent No.: US 7,595,456 B2
(45) Date of Patent: Sep. 29, 2009

(54) DIMMER SWITCH

(75) Inventors: Kunihiko Fukui, Saitama (JP);
Masahiro Inoue, Saitama (JP); Masaki Yamazaki, Saitama (JP); Yukinori Kawaguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 764 days.

(21) Appl. No.: 11/391,711

(22) Filed: Mar. 29, 2006

(65) Prior Publication Data

US 2006/0262234 A1 Nov. 23, 2006

(30) Foreign Application Priority Data

Mar. 30, 2005 (JP) ............................. 2005-099428

(51) Int. Cl.
*H01H 9/00* (2006.01)

(52) U.S. Cl. ..................... 200/4; 200/61.54; 200/567

(58) Field of Classification Search ................. 200/5 R, 200/14, 17 R, 61.54, 61.57, 564, 566, 567, 200/336, 332.2

See application file for complete search history.

(56) References Cited

U.S. PATENT DOCUMENTS 6,894,242 B2 * 5/2005 Muller et al. ............... 200/568
7,223,926 B1 * 5/2007 Gannon et al. ............. 200/11 R
7,285,738 B2 * 10/2007 Lavigne et al. ................. 200/4
7,307,232 B2 * 12/2007 Altmann et al. ............. 200/564
7,495,187 B2 * 2/2009 Sallam et al. .............. 200/11 R

FOREIGN PATENT DOCUMENTS

EP 0426538 A1 8/1991
JP 2002-231102 8/2002

* cited by examiner

*Primary Examiner*—Michael A Friedhofer
(74) *Attorney, Agent, or Firm*—Westerman, Hattori, Daniels & Adrian, LLP.

(57) ABSTRACT

A dimmer switch takes the form of a rotary switch including a stationary portion fixed to a vehicle and an operable rotary portion, and is constructed such that switching between a high beam position and a low beam position is made by a rotational operation in opposite directions at a same position in an axial direction of the rotary portion. In addition, the rotary portion is slideable in the axial direction, and a rotational operation to switch from the low beam position to the off position can not be made without the axial sliding movement of the rotary portion. Hence, switching from one of the high beam, low beam, and off positions to another can be made by a same rotational operation, while an erroneous operation to switch to the off state when a switching from high beam to low beam is prevented.

5 Claims, 7 Drawing Sheets

DIMMER SWITCH

TECHNICAL FIELD

The present invention relates to a dimmer switch, and more particularly, to a dimmer switch with which a light is turned on and off and a switching between low beam and high beam of the light is made, without an erroneous operation.

BACKGROUND OF THE INVENTION

Conventionally, a dimmer switch for operating headlights therewith in a vehicle such as four-wheel vehicle, is disposed on a long lever whose end is supported in the vicinity of a steering wheel. The dimmer switch includes at an end thereof a rotary portion disposed coaxially with a central axis of the lever, and the rotary portion is operated to turn on and off the headlight. Typically, switching between low beam and high beam is made by inclining or turning the lever within a predetermined movable range thereof around the supporting portion thereof. The structure of the dimmer switch operated in the above-described way is suitable for a combination dimmer switch where the switching between low beam and high beam as well as operations of a passing light, a turn indicator, and/or others are possible using a single lever. However, the thus constructed dimmer switch requires a special arrangement for reducing the overall size of the switch.

To solve this problem, Japanese Patent Application No. 231102/2002 discloses a lever switch operating apparatus for vehicles where a link arm including a driving arm and a driven arm is disposed between a lever and a sliding type switch that is slid by inclining or turning the lever, so as to reduce a difference in height between a supporting portion at which the lever is supported and the sliding type switch, thereby enabling to reduce the overall size of the switch.

SUMMARY OF THE INVENTION

However, with the dimmer switch of Japanese Patent Application No. 231102/2002, the headlight is turned on/off by an operation which is different from an operation by which switching between high beam and low beam is made. Further, a passing light and a turn indicator are operated using the same lever. Hence, it is required that a driver is accustomed to handling of the lever to some degree. On the other hand, a vehicle such as an MUV (Multi Utility Vehicle) mainly used in private grounds for leisure and agricultural work, may not have a turn indicator, which is required for running in public roads. Such a vehicle does not need a combination switch as disclosed in Japanese Patent Application No. 231102/2002, but desires a highly user-friendly switch exclusively for operation of the headlights, which switch is easily operable by the driver even during running in an uneven terrain.

An object of this invention is to provide a dimmer switch that enables switching between on and off states as well as between high beam and low beam of a headlight, by a same operation, and is more easily operable by a driver even during running in an uneven terrain, for instance.

To attain the above object, the invention provides a dimmer switch which is a rotary switch including a stationary portion fixed to a vehicle and an operable rotary portion, and which is capable of switching, by an operation of the rotary portion, an operating state of a light mounted on the vehicle, among off, low beam, and high beam, in this order or in the reverse order. A first characteristic of the dimmer switch includes the rotary portion being slideable along an axial direction thereof, and the rotary portion being rotated at a position in the axial direction to make a switching between high beam and low beam, and being slid in the axial direction and then rotated to turn the light off.

A second characteristic of the dimmer switch according to the invention resides in that the dimmer switch comprises biasing means disposed between the rotary portion and the stationary portion, and biasing the rotary portion in the axial direction.

A third characteristic of the dimmer switch according to the invention resides in that the rotary portion is slideable in the axial direction from any rotational position between a position corresponding to high beam and a position corresponding to low beam.

A fourth characteristic of the dimmer switch according to the invention resides in that the stationary portion has restricting means which holds the position of the rotary portion as has been slid, against a biasing force of the biasing means.

A fifth characteristic of the dimmer switch according to the invention resides in that the rotary portion has a stopper which limits the rotation of the rotary portion.

A sixth characteristic of the dimmer switch according to the invention resides in that the stopper is disposed on an inner circumferential surface of the rotary portion at a portion where a diameter of the circumferential surface is maximum.

According to the invention, switching between on and off states and switching between low beam and high beam can be made by a same rotational operation, thereby enhancing operation easiness. Further, since a switching to the off state is not made unless the rotary portion is slid in the axial direction, an erroneous switching to the off state is prevented.

Also, according to the invention, sliding the rotary portion to switch to the off state is made against the biasing force of the biasing means, thereby reliably preventing an erroneous switching to the off state.

Additionally, according to the invention, an operation to at once switch the operating state of the light from high beam to off is enabled, thereby enhancing a degree of freedom in operation.

Also, according to the invention, the dimmer switch has a restricting means that holds the position of the rotary portion as has been slid against the biasing force of the biasing means, thereby enabling to reliably maintain the dimmer switch at a position corresponding to the off state of the light.

Further, according to the invention, the stopper that limits the rotation of the rotary portion is disposed inside the rotary portion, thereby enabling a reliable operation of the switch.

Furthermore, according to the invention, the stopper is disposed on the inner circumferential surface of the rotary portion at the portion where the diameter of the circumferential surface is maximum, thereby minimizing a force imposed on the stopper when the switch is operated.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
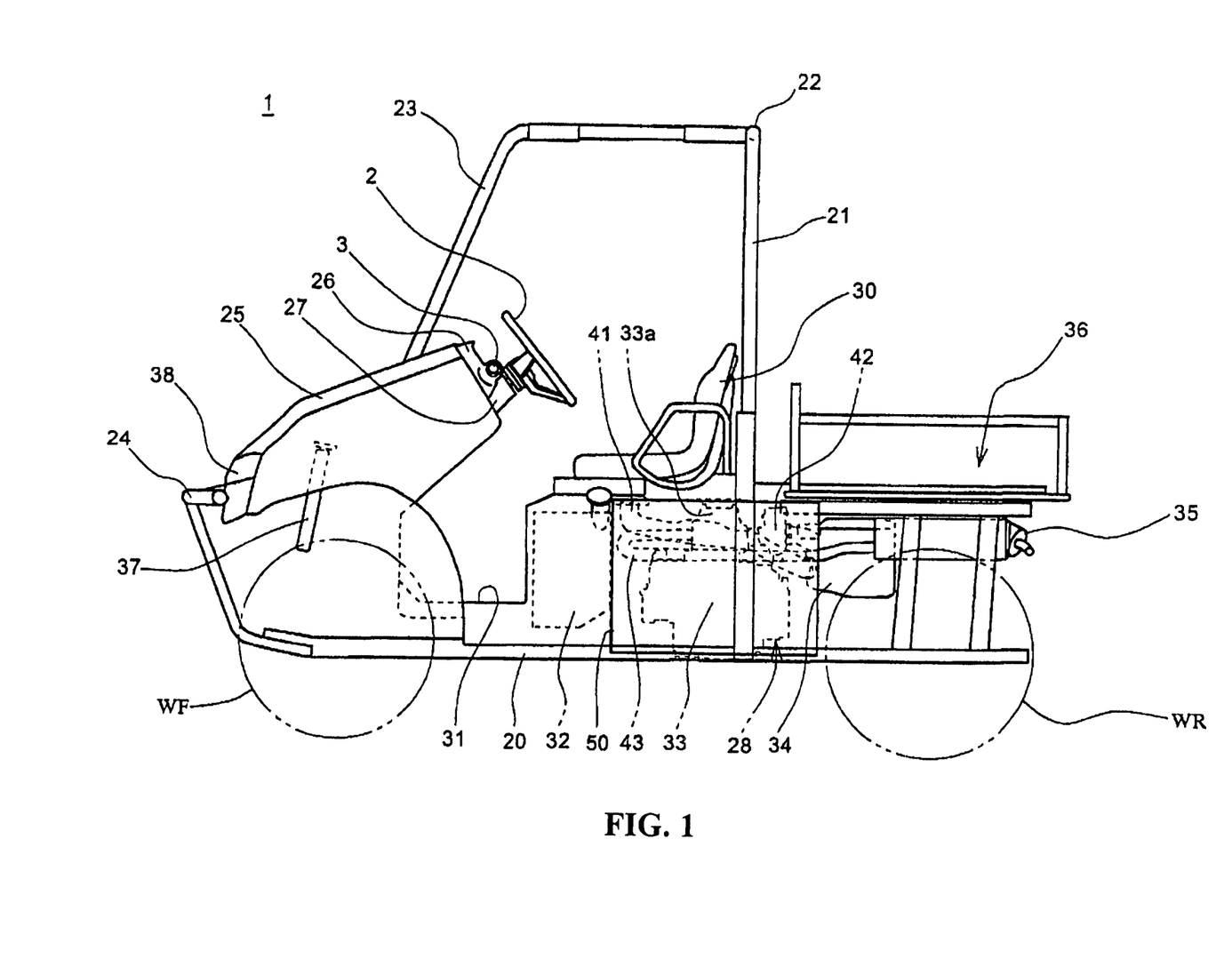
FIG. 1 is a side view of an embodiment of an MUV to which the invention is applied.

FIG. 1 is a side view of an embodiment of an MUV (Multi Utility Vehicle) to which the invention is applied. The MUV 1 is a multipurpose four-wheel vehicle, in which front wheels WF and rear wheels WR are rotatably supported by a frame 20 of a vehicle body, and which runs by a driving force supplied from an engine 33 disposed at a central portion of the vehicle body to the rear wheels WR. A roll bar constituted by a pillar member 21, a connecting pipe 22, and a front member 23 is connected to and above the frame 20 of the vehicle body, so as to protect an occupant. A bumper 24 that protects a front-side portion of the MUV 1 against an impact of collision is disposed in front of the frame 20 of the vehicle body. Below a seat 30 on which the occupant is to be seated, a fuel tank 32 is located. A floor 31 in which an accelerator pedal and a brake pedal (neither shown) are disposed is positioned in the vehicle body and on the front side of the fuel tank 32.

A power unit 28 consisting of the engine 33 as an internal combustion engine, a transmission, and others is disposed in a side parting wall 50 disposed in the vehicle body on the rear side of the fuel tank 32. Air taken in from the outside through an intake tube 41 disposed below the seat 30 is filtered by an air cleaner 34 and then directed into a carburetor 42 in which a mixture gas of the air and a fuel is produced. The mixture gas which has been exploded in a combustion chamber in the engine 33 to give a rotating or driving force to the engine 33, that is, an exhaust gas, is sent to a muffler 35 on the rear side in the vehicle body through an exhaust pipe 43 connected to an exhaust port of a cylinder head 33a. The exhaust gas is subjected to purification and noise reduction at the muffler 35, and then discharged into the atmosphere.

A box-shaped body above the muffler 35 is a cargo bed 36 having a side panel openable/closable. A radiator 37 for cooling a coolant of the engine 33 is disposed above the front wheels WF that are steerable with a steering wheel 2, rotatably supported by a handle post 27.

A dimmer switch 3 according to the invention is disposed in a dashboard 26 in the vicinity of the steering wheel 2. Headlights 38, disposed in front of a front fender 25, are switchable between on/off states and between low beam and high beam, by operating the dimmer switch 3.

Figure 2:
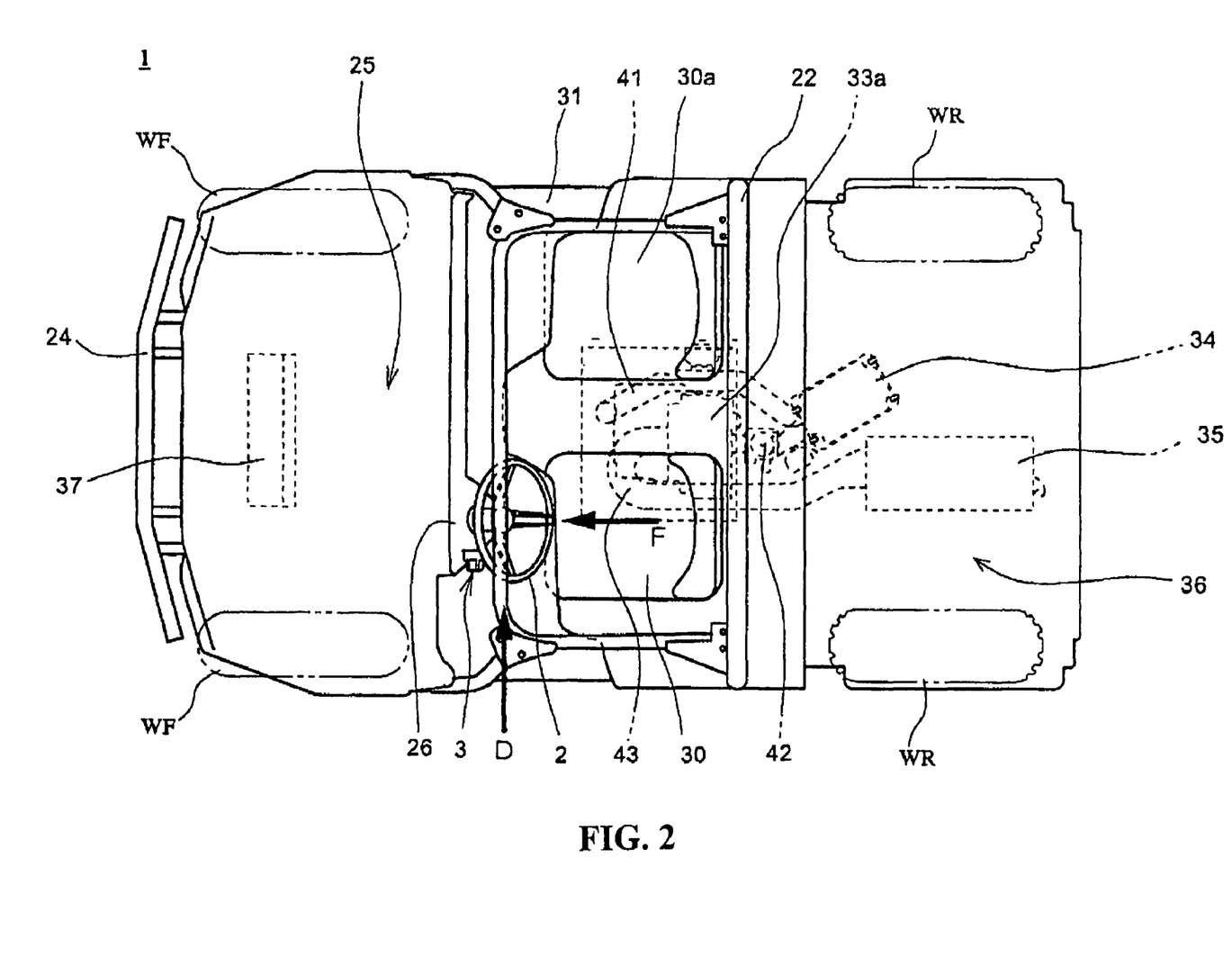
FIG. 2 is a top plan view of an embodiment of the MUV to which the invention is applied.

FIG. 2 is a top plan view of the MUV in which the invention is applied. The same reference numerals as in the above description denote the same or similar portions. The MUV 1 is a two-seater vehicle having a passenger seat 30a. The connecting pipe 22 constituting the roller bar extends between opposing lateral ends of the vehicle body, and cooperates with the frame 20 of the vehicle body to contribute to improving the rigidity of the vehicle body. The dimmer switch 3 according to the invention is disposed at a leftmost portion of the dashboard 26.

Figure 3:
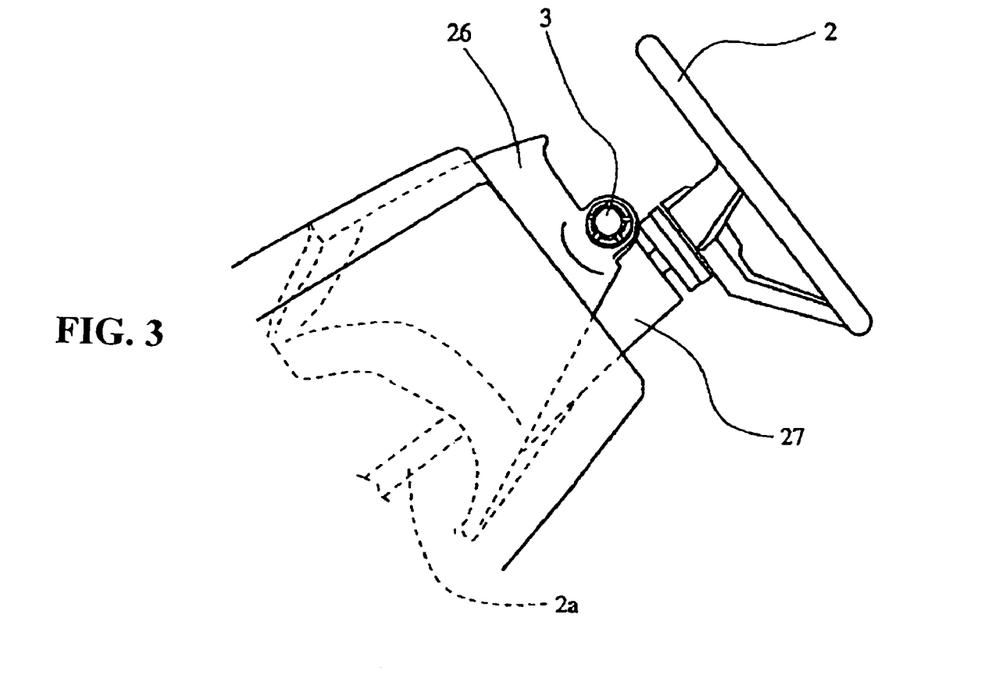
FIG. 3 is an external side view of a dimmer switch according to the invention.
Figure 4:
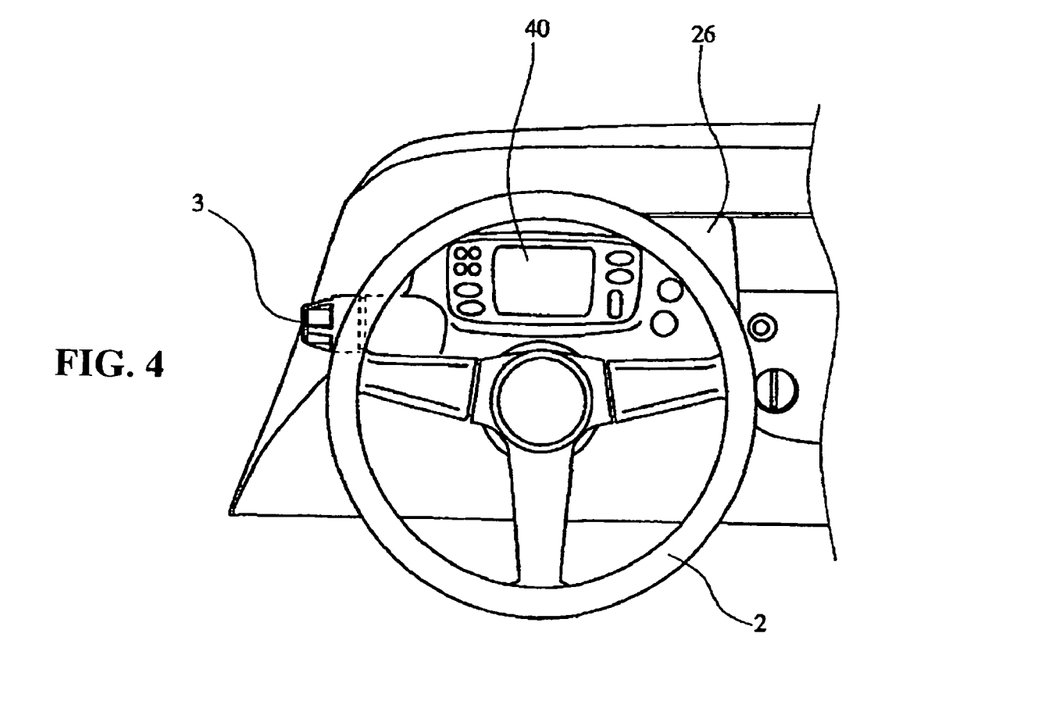
FIG. 4 is an external elevation of the dimmer switch according to the invention.

FIGS. 3 and 4 are external views of the dimmer switch 3 as seen from directions D and F in FIG. 2, respectively. The same reference numerals as in the above description denote the same or similar portions. The dimmer switch 3 is disposed in the vicinity of the steering wheel 2, and can be easily operable by extending a left hand off the steering wheel 2 only by a small amount. A display panel 40 where an engine speed, a driving velocity, and other information are presented is disposed in front of the steering wheel 2. An operation or rotation of the steering wheel 2 by an occupant is transmitted to a rack-and-pinion mechanism or the like via a steering shaft 2a connected to the rotation axis of the steering wheel 2, and converted into a steering motion of the front wheels WF.

Figure 5A:
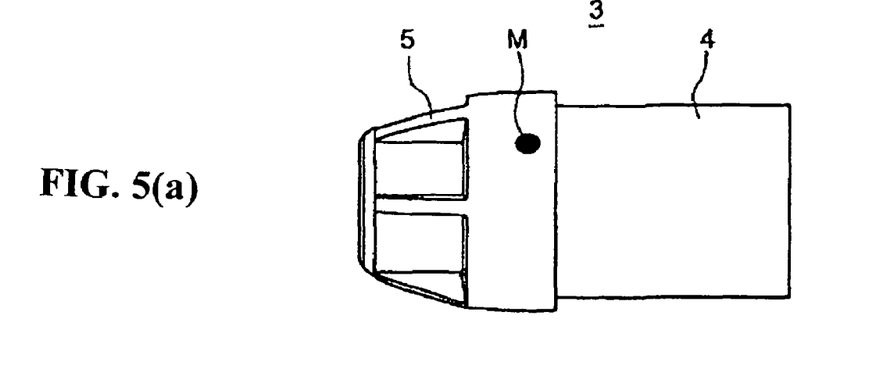
FIGS. 5(a), 5(b), and 5(c) are front elevational views of the dimmer switch according to the invention.
Figure 5B:
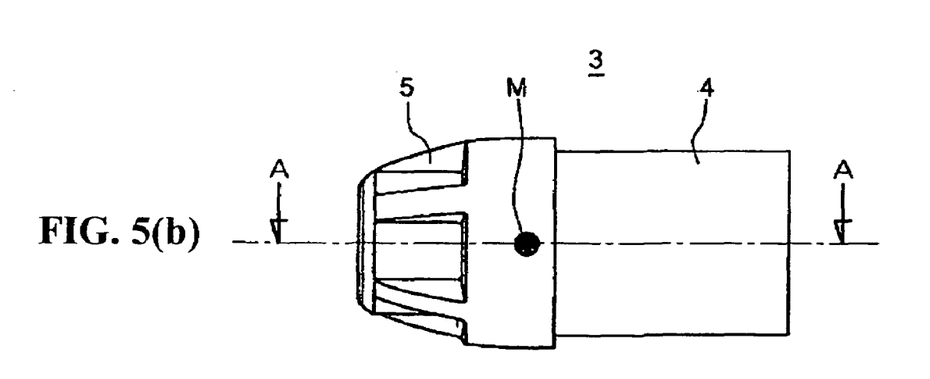
Figure 5C:
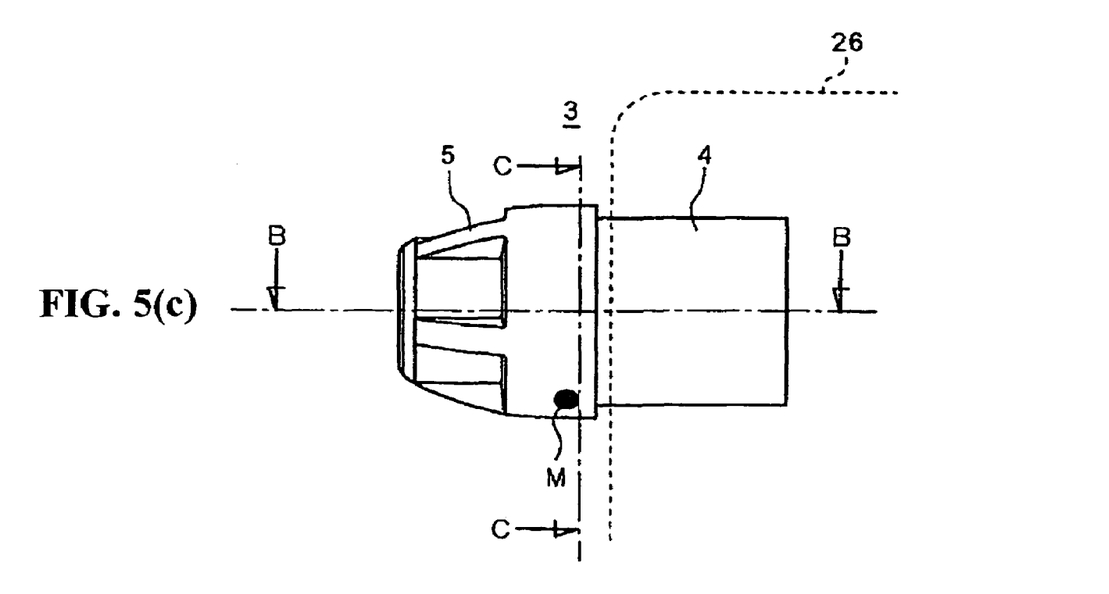

FIGS. 5(a)-5(c) are front elevational views of the dimmer switch 3. The dimmer switch 3 has a substantially cylindrical main body portion 4 as a stationary portion, and an operation dial 5 as a rotary portion that is attached to the main body portion 4 coaxially with the main body portion 4. FIGS. 5, (a), (b) and (c) respectively show high beam (on) position, low beam (on) state, and off state. In the present embodiment, when the operation dial 5 is rotated from the high beam position of FIG. 5(a) downward, that is, in the clockwise direction around a central axis, the rotation of the operation dial 5 is allowed up to 45 degrees and a further rotation is impossible, and thus the operation dial 5 is held at the low beam position of FIG. 5(b). The operation dial 5 is freely rotatable between the positions of FIG. 5(a) and FIG. 5(b), and can not be placed in any other states than those of (a) and (b) only by the rotational operation.

Then, at the low beam position of (b), the operation dial 5 can be pressed rightward as seen in FIG. 5 (i.e., an axial direction) up to a predetermined position. Only in this pressed state, the operation dial 5 can be further rotated downward as seen in FIG. 5 (or in the clockwise direction). After the rotational operation of the operation dial 5 is started while the operation dial 5 is in the pressed state, this pressed state is maintained, and this rotation of the operation dial 5 is allowed up to 45 degrees in the clockwise direction from the low beam position of (b) and further rotation is impossible so that the operation dial 5 is maintained at the off position of (c).

On the other hand, where the operation dial 5 is rotated in the reverse direction from the off position of (c) upward as seen in FIG. 5 (i.e., in the counterclockwise direction), when rotated up to 45 degrees, the operation dial 5 as has been held in the pressed state returns to its original position by a spring force of biasing means as described later, to be placed at the low beam position of (b). As described above, the position of the operation dial 5 is freely switchable between the low beam position of (b) and the high beam position of (a) by only a rotational operation. Since an operation to press the operation dial 5 in the axial direction can be made from the high beam position (a), an operation to at once switch the position of the operation dial 5 from the high beam position (a) to the off position (c) is possible.

When the dimmer switch 3 is fixed to the dash board 26, most of the main body portion 4 is accommodated in the dashboard 26 when the operation dial 5 is in the off position (c). Hence, the occupant of the vehicle can easily recognize a change in an amount of protrusion of the operation dial 5. This and a change in the position of a white mark M enable the occupant to easily see in which state the switch is currently placed. The white mark M is such that a circular dent is formed and then the dent is painted white, and thus made highly visible.

Figure 6:
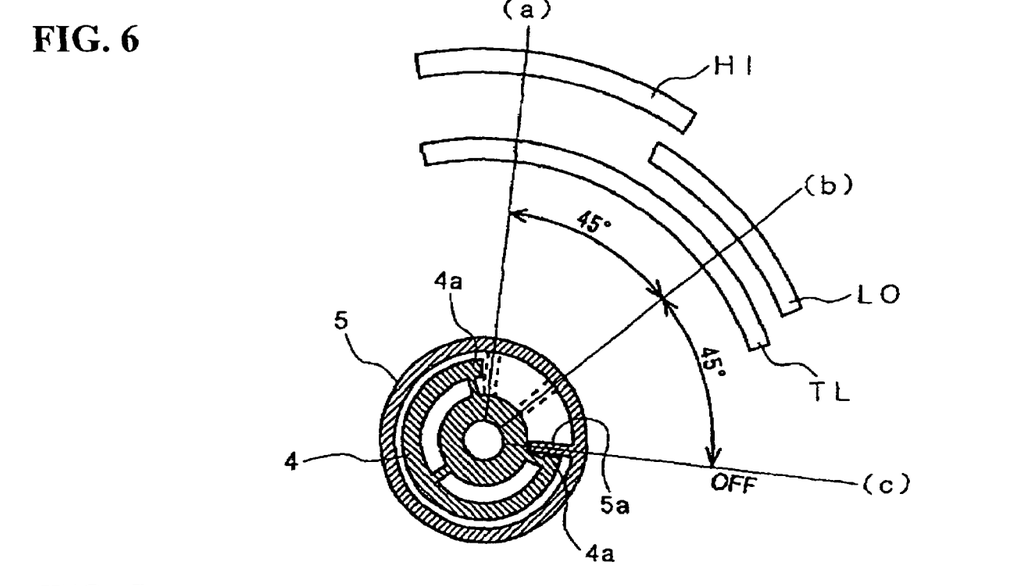
FIG. 6 is a diagram showing a relationship between a cross-sectional view taken along line C-C in FIG. 5(c) and lighting ranges of a light.

FIG. 6 shows a relationship between a cross-sectional view taken along line C-C in FIG. 5(c) and lighting ranges of the light. A stopper 5a formed on an inner circumferential portion of the operation dial 5 limits the rotation of the operation dial 5 by being brought into contact with an engaging portion 4a of the main body portion 4 at the off position (c) and the high beam position (a). Reference symbols HI, LO, and TL of the lighting ranges respectively denote high beam, low beam, and tail light. When the operation dial 5 is at the high beam position (a), the headlight 38 is on in high beam mode and a tail light is also on. When the operation dial 5 is at the low beam position (b), the headlight 38 is on in low beam mode and the tail light is on. When the operation dial 5 is at the off position (c), both the headlight 38 and the tail light are off.

Figure 7:
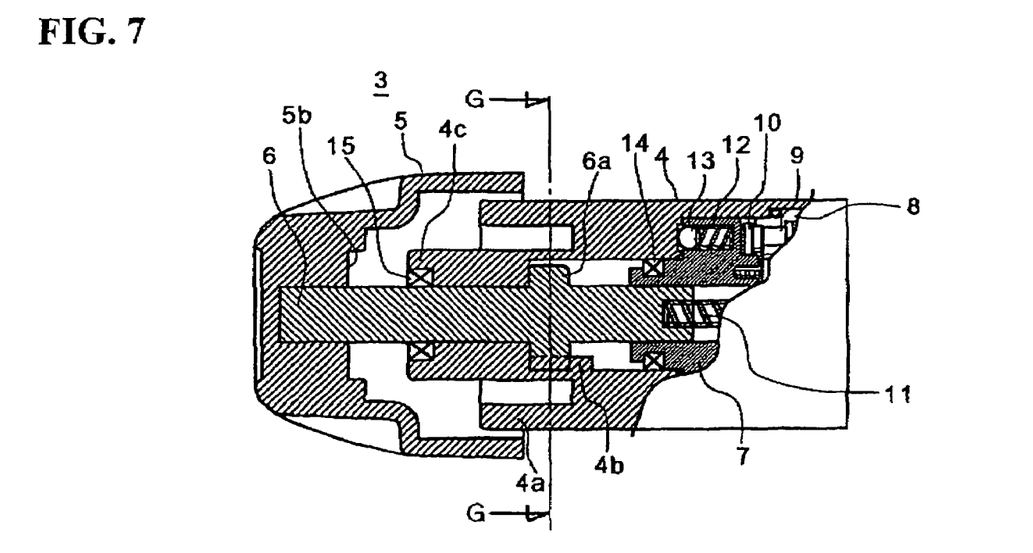
FIG. 7 is a cross-sectional view taken along line A-A in FIG. 5(b)

FIG. 7 is a cross-sectional view taken along line A-A in FIG. 5(b). The same reference numerals as in the above description denote the same or similar portions. A rotating shaft 6 integrally driven with the operation dial 5 is accommodated in the main body portion 4. At the low beam position shown in FIG. 7, a rotating shaft stopper 6a for the rotating shaft 6 is in contact with the engaging portion 4b, thereby inhibiting further rotation of the rotating shaft 6 in the clockwise direction. The rotating shaft 6 is kept biased leftward as seen in FIG. 7 by biasing means 11 taking the form of a spring. However, by the occupant pressing the operation dial 5 rightward as seen in FIG. 7 with a force against a spring force of the biasing means 11, the operation dial 5 can slide to a position to bring an inner wall portion 5b of the operation dial 5 into contact with a shaft supporting portion 4c of the main body portion 4. An oil seal 15 that prevents introduction of water, grit, and others is disposed at a leftmost portion of the shaft supporting portion 4c.

On the radially outer side of the biasing means 11, a base member 7 that is rotated with rotation of the rotating shaft 6 is supported by, and coaxially with, the main body portion 4 via an O-ring 14. Biasing means 12 in the form of a spring disposed in the base member 7 biases the base member 7 rightward as seen in FIG. 7, so that a switch contact 10 disposed on the base member 7 is pressed onto a switch contact 9 disposed on a joint plate 8, thereby ensuring stable electrical connection therebetween. An iron ball 13 disposed between the biasing means 12 and the main body portion 4 reduces a contact area between the rotated base member 7 and the main body portion 4, thereby reducing a sliding resistance generated when the base member 7 is rotated.

Figure 8:
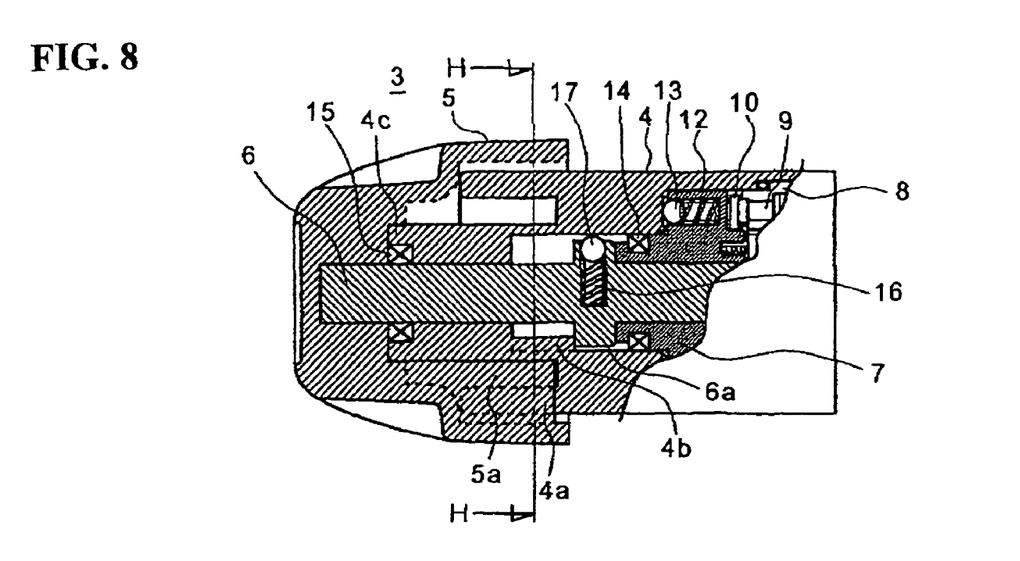
FIG. 8 is a cross-sectional view taken along line B-B in FIG. 5(c)

FIG. 8 is a cross-sectional view taken along line B-B in FIG. 5(c). The same reference numerals as in the above description denote the same or similar portions. When the operation dial 5 is pressed rightward as seen in FIG. 7 against the spring force of the biasing means 11, the rotating shaft stopper 6a gets out of a range within which the rotating shaft stopper 6a engages with the engaging portion 4b, thereby allowing rotation of the operation dial 5 from the low beam position to the off position. When the operation dial 5 thus begins rotating, the position of a leftmost portion of the rotating shaft stopper 6a is determined by a rightmost portion of the engaging portion 4b as restricting means, whereby the state where the rotating shaft 6 and the operation dial 5 are pressed is maintained. An iron ball 17 biased by biasing means 16 in the rotating shaft 6 onto an inner circumferential surface of the main body portion 4 engages a hemispherical groove (not shown) formed on the inner circumferential surface of the stationary portion 4 at each of the high beam, low beam, and off positions, thereby giving a detent feeling in an operation of the operation dial 5.

Figure 9A:
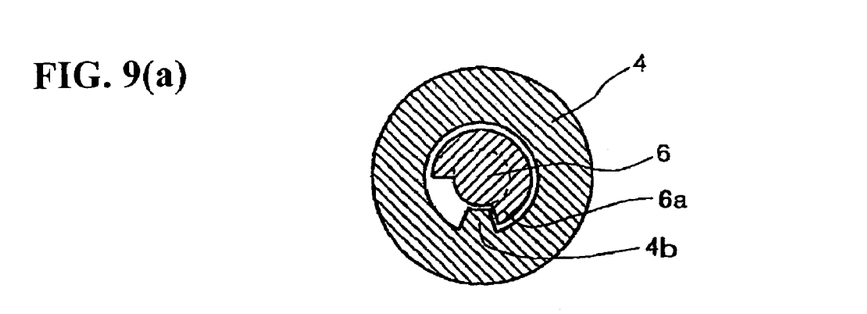
FIG. 9(a) is a schematic cross-sectional view taken along line G-G in FIG. 7
Figure 9B:
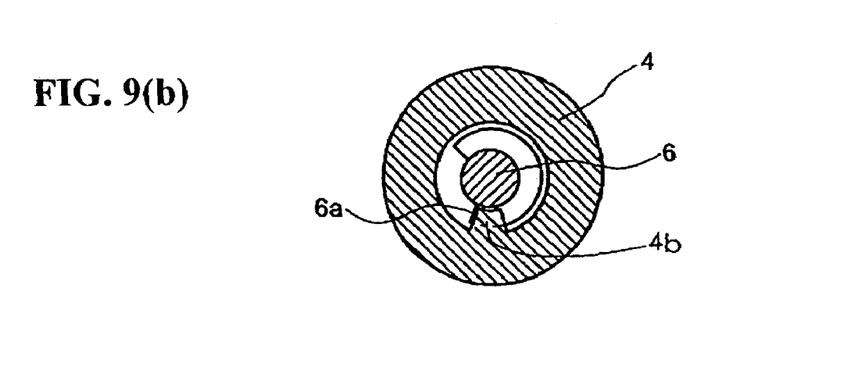
FIG. 9(b) is a schematic cross-sectional view taken along line H-H in FIG. 8.

Referring to FIGS. 9(a) and 9(b) that are respectively a schematic cross-sectional view taken along line G-G in FIG. 7 and a schematic cross-sectional view taken along line H-H in FIG. 8, there will be described the engagement relationship between the rotating shaft stopper 6a and the engaging portion 4b. When the rotating shaft 6 is pressed in the axial direction (i.e., the direction perpendicular to the sheet in which FIG. 9(a) is presented and away from the viewer) and then rotated in the clockwise direction while the dimmer switch 3 is in the low beam position shown in FIG. 9(a), an end face of the rotating shaft stopper 6a on the side near the viewer of FIG. 9(a) begins to engage with an end face of the engaging portion 4b on the side remote from the viewer of FIG. 9(a), thereby maintaining the state where the rotating shaft 6 and the operation dial 5 are pressed. FIG. 9(b) shows the off position where the rotating shaft 6 is rotated 45 degrees from the low beam position. It is to be understood that the configuration and others of each of the parts that establish the engagement relationship are not limited to those of the present embodiment.

Figure 10A:
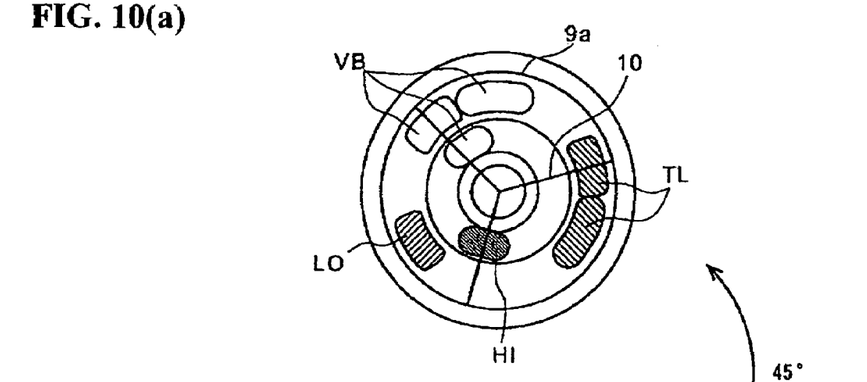
FIGS. 10(a), 10(b), 10(c), and 10(d) are diagrams illustrating a relationship between switch contacts, and a table indicating an electrical connection state.
Figure 10B:
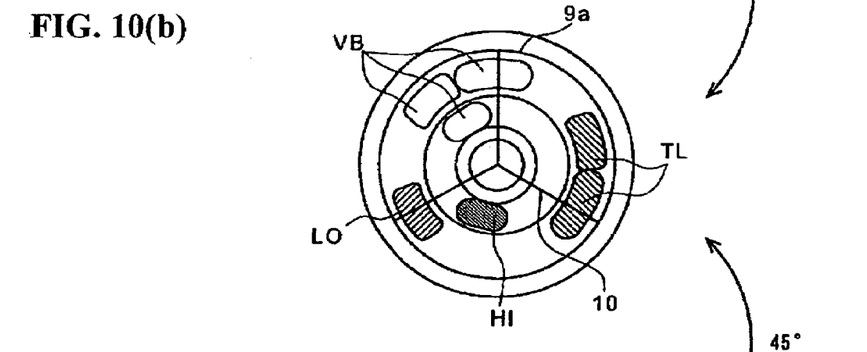
Figure 10C:
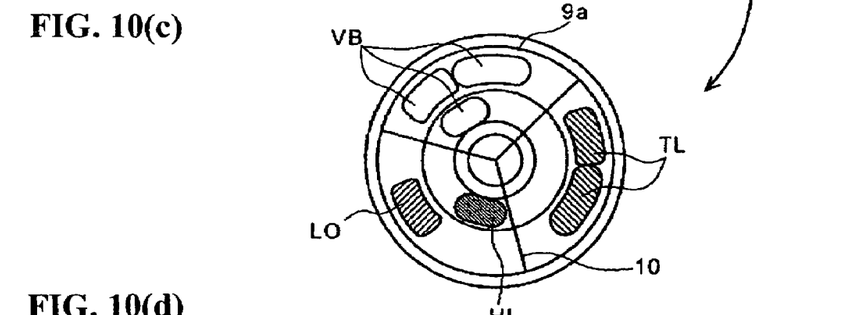
Figure 10D:
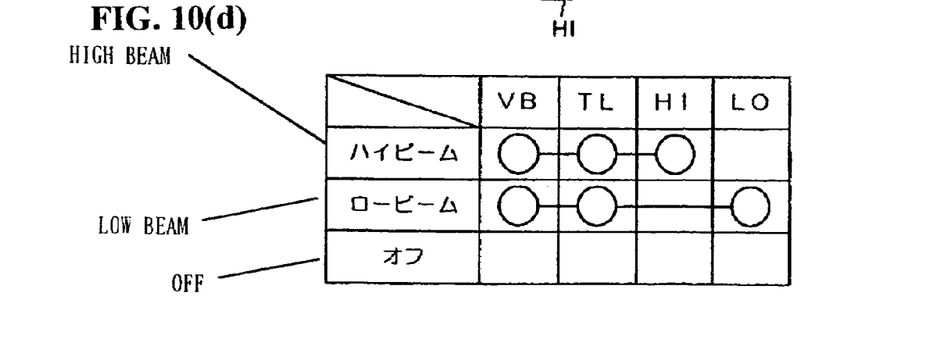

FIGS. 10(a)-(c) schematically show relative positions between the switch contact 10 that is rotated with the rotating shaft 6, and the switch contact 9 of the joint plate 8, and FIG. 10(d) shows a relationship between the switch position and contacts where electrical connection is established. The switch contact 10 has three terminals spaced from one another 120 degrees apart around an axis. When the dimmer switch 3 is in the high beam position of (a), VB (power supply), HI (high beam), and TL (tail light) are electrically connected. In the low beam position where the switch contact 10 is rotated 45 degrees in the clockwise direction from the high beam position of (a), VB, LO (low beam), and TL are electrically connected. When the switch contact 10 is further rotated 45 degrees in the clockwise direction, the dimmer switch 3 is placed in the off state where electrical connection is not established anywhere.

As described above, the invention enhances operation easiness such that switching between on and off states and switching between low beam and high beam are made possible by a same rotational operation, as well as switching to the off state can not be made unless the operation dial 5 is pressed in the axial direction. Hence, a dimmer switch free from an erroneous operation to switch to the off state is obtained.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A rotary type dimmer switch for controlling a light of a vehicle between an off state, a low beam state, and a high beam state, in the above order or in a reverse order, said rotary type dimmer switch comprising:

a stationary portion fixed to the vehicle;

an operable rotary portion being rotatable with respect to said stationary portion and being axially slideable with respect to said stationary portion; and structural means for switching between the low beam state and the high beam state by rotational motion only of said rotary portion and for switching between one of said low beam and high beam states and the off state by axial and rotational movement of said rotary portion.

2. The rotary type dimmer switch of claim 1, wherein said structural means includes a biasing element disposed between said rotary and stationary portions to bias said portions apart from one another in the axial direction.

3. The rotary type dimmer switch of claim 2, wherein said two structural means includes, a stopper formed on an inner circumferential surface of said rotary portion, and a first engagement surface formed on said stationary portion, wherein said stopper is engageable with said first engagement surface to limit rotation of said rotary portion, such that said rotary portion is axially slideable from the low beam and the high beam states.

4. The rotary type dimmer switch of claim 3, wherein said structural means further includes a second engagement surface formed on said stationary portion, said second engagement surface being engageable with a secondary stopper surface formed on said rotary portion, such that, when said rotary portion is slid axially and rotated to the off state, said rotary portion is prevented from being axially shifted by said biasing element.

5. The rotary type dimmer switch of claim 3, wherein said stopper is formed on an inner circumferential surface of said rotary portion at a location where a diameter of said inner circumferential surface is at a maximum.

* * * * *